US006751718B1

(12) United States Patent
Manin

(10) Patent No.: US 6,751,718 B1
(45) Date of Patent: Jun. 15, 2004

(54) METHOD, SYSTEM AND COMPUTER PROGRAM PRODUCT FOR USING AN INSTANTANEOUS MEMORY DEFICIT METRIC TO DETECT AND REDUCE EXCESS PAGING OPERATIONS IN A COMPUTER SYSTEM

(75) Inventor: Dmitrii Manin, Palo Alto, CA (US)

(73) Assignee: Networks Associates Technology, Inc., Santa Clara, CA (US)

(*) Notice: Subject to any disclaimer, the term of this patent is extended or adjusted under 35 U.S.C. 154(b) by 377 days.

(21) Appl. No.: 09/818,008

(22) Filed: Mar. 26, 2001

(51) Int. Cl.$^7$ ............................................... G06F 12/00
(52) U.S. Cl. ........................... 711/170; 711/220; 714/1; 714/699
(58) Field of Search ................................. 711/170, 220, 711/153, 156, 161, 209, 699; 714/745, 763, 1

(56) References Cited

U.S. PATENT DOCUMENTS

| | | | |
|---|---|---|---|
| 4,460,997 A | | 7/1984 | Harns ........................... 714/711 |
| 4,660,130 A | * | 4/1987 | Bartley et al. ............... 711/209 |
| 4,758,944 A | * | 7/1988 | Bartley et al. ............... 711/171 |
| 5,388,242 A | * | 2/1995 | Jewett ......................... 711/113 |
| 5,423,029 A | | 6/1995 | Schieve ........................ 714/42 |
| 5,530,805 A | | 6/1996 | Tanabe ......................... 714/42 |
| 5,555,249 A | | 9/1996 | Hilley et al. ................. 714/718 |
| 5,561,765 A | | 10/1996 | Shaffer et al. ................. 714/42 |
| 5,581,736 A | * | 12/1996 | Smith ........................... 711/170 |
| 5,621,883 A | | 4/1997 | Thoulon et al. ................ 714/9 |
| 5,673,388 A | | 9/1997 | Murthi et al. ................. 714/42 |
| 5,689,635 A | | 11/1997 | Petrosino ...................... 714/42 |
| 5,696,926 A | | 12/1997 | Culbert et al. .............. 711/203 |
| 5,717,697 A | | 2/1998 | Yin .............................. 714/722 |
| 5,720,031 A | | 2/1998 | Lindsay ........................ 714/42 |
| 5,742,616 A | | 4/1998 | Torreiter et al. ............. 714/732 |
| 5,771,346 A | | 6/1998 | Norman et al. ................ 714/42 |
| 5,831,987 A | | 11/1998 | Spilo ........................... 714/719 |
| 5,835,704 A | | 11/1998 | Li et al. ........................ 372/45 |
| 5,875,474 A | * | 2/1999 | Fabrizio et al. ............. 711/153 |
| 5,943,693 A | | 8/1999 | Barth ........................... 711/220 |
| 6,304,949 B1 | * | 10/2001 | Houlsdworth ............... 711/170 |
| 6,324,631 B1 | * | 11/2001 | Kuiper ......................... 711/170 |
| 6,339,779 B1 | * | 1/2002 | Houldsworth ............... 707/206 |
| 6,349,375 B1 | * | 2/2002 | Faulkner et al. ............. 711/173 |
| 6,408,313 B1 | * | 6/2002 | Campbell et al. ............ 707/205 |
| 6,427,154 B1 | * | 7/2002 | Kolodner et al. ........... 707/206 |
| 6,516,342 B1 | * | 2/2003 | Feldman et al. ............. 709/216 |

* cited by examiner

Primary Examiner—Donald Sparks
Assistant Examiner—C. P. Chace
(74) Attorney, Agent, or Firm—Silicon Valley IP Group, PC; Kevin J. Zilka; Christopher J. Hamaty

(57) ABSTRACT

A method, system and computer program product for detecting when insufficient RAM is available in a computer system, and estimating the additional RAM needed to avoid excess paging. The invention uses memory management parameters to estimate the number of frequently-used pages stored in "virtual memory" on disk. If this estimate is nonzero for an appreciable period the amount of RAM is insufficient, and RAM equal to the estimate should be added to the system.

10 Claims, 5 Drawing Sheets

METHOD, SYSTEM AND COMPUTER PROGRAM PRODUCT FOR USING AN INSTANTANEOUS MEMORY DEFICIT METRIC TO DETECT AND REDUCE EXCESS PAGING OPERATIONS IN A COMPUTER SYSTEM

FIELD OF THE INVENTION

The present invention relates to the field of computer systems. In particular, it relates to computer systems in which "virtual memory" is used to extend the available RAM.

BACKGROUND OF THE INVENTION

An exemplary computer system is shown in FIG. 1. The computer system 100 includes a central processing unit (CPU) 101 for running applications, a disk storage 102, a RAM 103, and a user interface 104. Random access memory, or RAM, is used in computer systems to store current processes—the code for currently-running applications and the data used by those applications. An operating system 105, a memory management system 106, which may be part of the operating system 105, a file system 107 and applications programs 108 are typically stored in RAM 103. Applications and data that are not currently running are generally stored in disk storage 102, which cannot be accessed as quickly as RAM 103.

Many computer systems use "virtual memory" when the available RAM 103 is insufficient to store the code for all current processes. Virtual memory is a disk file or files in disk storage 102 that serves as an extension of RAM 103. Areas, or pages, of RAM 103 that are less frequently used are written to the paging file in virtual memory by the memory management system 106. The pages are read back into RAM 103 by the memory management system 106 when they are needed.

This approach is efficient when the total amount of memory that is frequently used by applications does not exceed the amount of RAM available. However, if the total amount of frequently-used memory, also called actively-used memory, is more than the amount of RAM available, the memory management system must frequently read and write pages from virtual memory disk files into RAM. This is a relatively slow and time-consuming process, with the result that efficiency of memory access is drastically reduced.

Applications that monitor server utilization need to be able to assess utilization of basic resources, such as RAM, disk storage and CPU. Monitoring RAM utilization is difficult. Prior art approaches include monitoring the percentage of RAM utilization, and monitoring paging activity.

Percentage of RAM utilization is not a useful indicator, however, because a high percentage of RAM utilization may mean that there is insufficient RAM and more is needed, which indicates that the system is not operating efficiently. Alternatively, it may mean only that nearly all the available RAM is being actively used, but no more is needed, which indicates that the system is operating efficiently. In addition, percentage of RAM utilization does not indicate how much additional RAM might be required.

Paging activity may indicate that insufficient RAM is available and more is required. However, a sharp increase in paging activity may merely indicate that new processes have been started and others terminated, so that some applications and data are being moved into RAM. Furthermore, paging activity does not give any indication of how much additional RAM is required to avoid excessive paging and resulting inefficiency.

Accordingly, it would be desirable to provide an approach to monitoring RAM use that indicates whether the system has insufficient RAM. It would additionally be desirable for this approach to indicate, where RAM is insufficient, how much additional RAM should be added to the system for efficient RAM usage.

SUMMARY OF THE INVENTION

A method and apparatus is provided in which memory management parameters are extracted from the memory management system, and used to calculate an estimate of the additional RAM needed to avoid excessive paging. If this additional memory requirement is greater than zero, or some small threshold, for a sustained period, the system is alerted that additional RAM is required.

In a preferred embodiment, the memory management parameters include the rate of hard faults, sometimes called major faults, $F_{HF}$, and the rate of soft faults, sometimes called minor faults, $F_{SF}$. These parameters, along with the quantities of RAM marked as available and actually in use, are used to estimate the number of pages in virtual memory that are needed often but that do not fit in RAM: the "memory demand," or "memory deficit."

In particular, the memory demand, $N_O$, is estimated by:

$$\tilde{N}_O = C * N_U * F_{HF}/F_{SF}$$

where $N_U$ is the number of pages which the memory management system has designated as in use by current processes, and C (where C is a factor that may be multiplied by the right-hand side of the above equation) is a parameter indicating whether there is a page-writing activity. The parameter C is set equal to 1 if there is page-writing activity, and is 0 otherwise.

DETAILED DESCRIPTION OF THE INVENTION

A computer system using virtual memory will use a memory management algorithm to use available RAM more efficiently. Memory management algorithms typically track RAM access for each page of RAM, allocate and deallocate pages of RAM based on access, and generate some kind of fault metric. In the present invention, a fault metric generated by a memory management system is used to determine whether more RAM is needed for efficient memory access, and to estimate any such memory deficit.

One example of a memory management algorithm is a "mark-sweep memory management algorithm." As discussed below, the mark-sweep memory management algorithm generates one or more fault rates, which may be used to identify and estimate any memory deficit. In the mark-sweep memory management algorithm, the "virtual pages" of all the current processes can each be in one of three states: "used," "out," or "marked." A page is "out" or when it is not present in RAM and is stored only in a disk file. A page is "paged in" when the page occupies a page frame in RAM: it is "used" if is not listed as available to be overwritten by another process, and is "marked" if it is listed as available. The number of marked pages is referred to as $N_M$, and the number of used pages is referred to as $N_U$.

When a mark-sweep memory recycling algorithm is used, the RAM is scanned constantly. If a page has been accessed by the process associated with that page since the last scan, the algorithm assumes the page is still being used by the process. If a page has not been accessed since the last scan, the algorithm assumes that the page is available for use by another process. Available pages are "marked," and if a page is needed by another process, a marked page will be selected. The contents of the marked page will then be "paged out," or written to disk storage, and the page will be overwritten.

Figure 1:
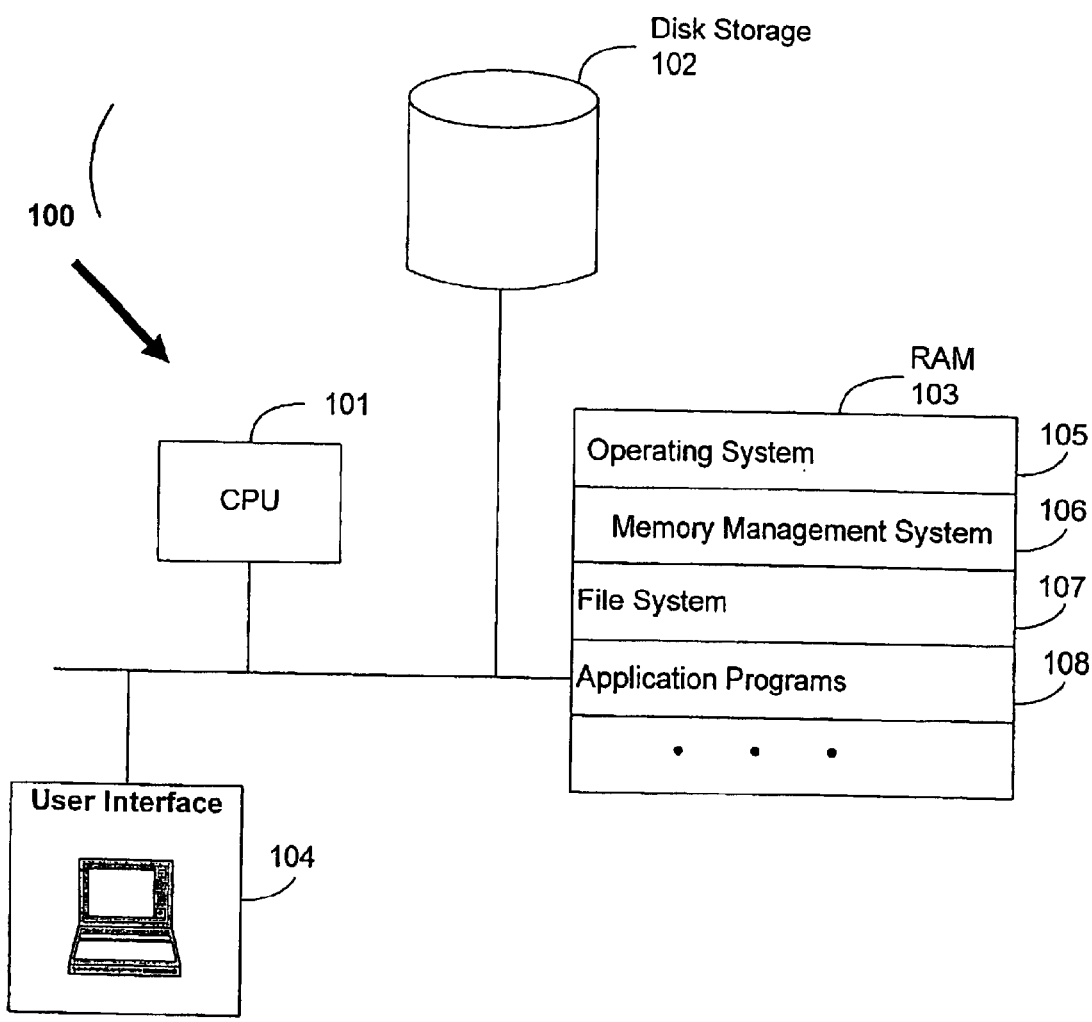
FIG. 1 is a block diagram of an exemplary computer system.
Figure 2:
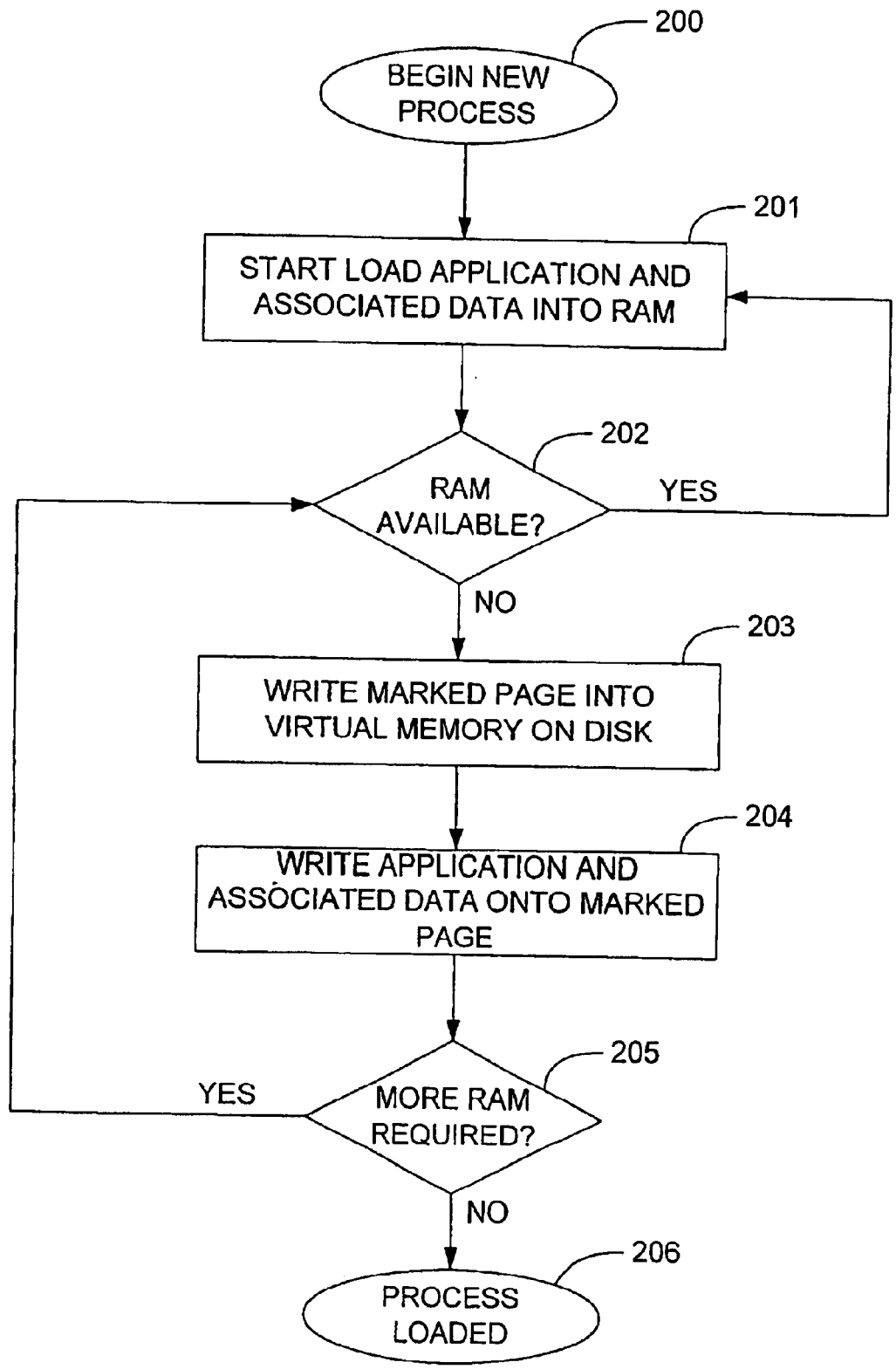
FIG. 2 is a flow chart showing how an application and data are loaded into RAM.

Pages transition from the marked state to the out state as shown in FIG. 2. The process starts at step 200. A new process—code for an application, and its associated data—is loaded at step 201 into RAM to be run by the CPU. A test is made at step 202 to determine if there is sufficient RAM available to store the process. If RAM is available, the process is loaded. If RAM is not available, it must be obtained by overwriting marked pages. At step 203, the information stored on the marked pages is written to the disk storage—to virtual memory—so that if it is needed later it can be retrieved and written into RAM again by the memory management system. The marked pages are then overwritten at step 204 with pages for the new process by the memory management system, and the process continues, at step 205, until the process is loaded 206. These marked pages have thus transitioned to the out state.

Figure 3:
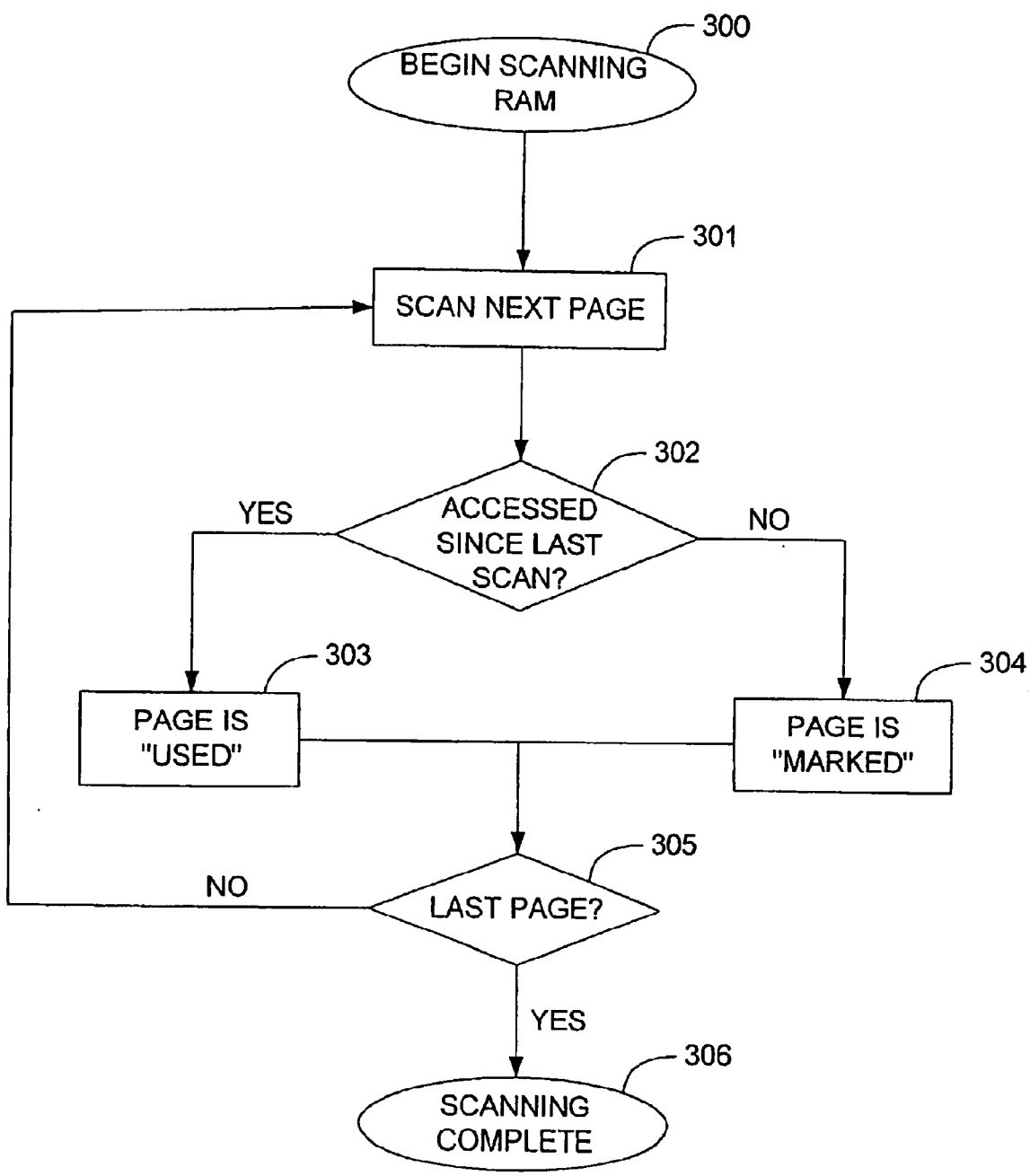
FIG. 3 is a flow chart showing how RAM is monitored through a scanning process.

The scanning process that designates pages as used and as marked, or available, is shown in FIG. 3. The algorithm beings'scanning at step 300, and scans each page sequentially 301. Each page is tested at step 302 to determine if it has been accessed since the last scan. If a scanned page has not been accessed since the last scan—that is, if the application or data has not been used by the CPU—the page is marked 303 and listed as available to be overwritten by a new process. If the page has been accessed, it is a used page 304 and should not be overwritten. All the pages in RAM are scanned at a scanning frequency $F_S$ that can be varied depending on memory utilization. Once the last page is scanned 305, the scanning process is complete 306.

As discussed in connection with FIG. 2, a page may transition from "marked" to "out," when it has been listed as available and is then written to disk storage and overwritten in RAM by another process. As shown in FIG. 3, a page may transition from "used" to "marked" if the page has not been accessed recently and the memory management system decides that the page is available for use by another process. Finally, a page may transition from "out" to "used," when a page that was written to disk storage is written back into RAM for use by a current process. This will occur when a page was marked and then overwritten even though the process using that page had not terminated. These transitions from one state to another are illustrated in FIG. 4.

Figure 4:
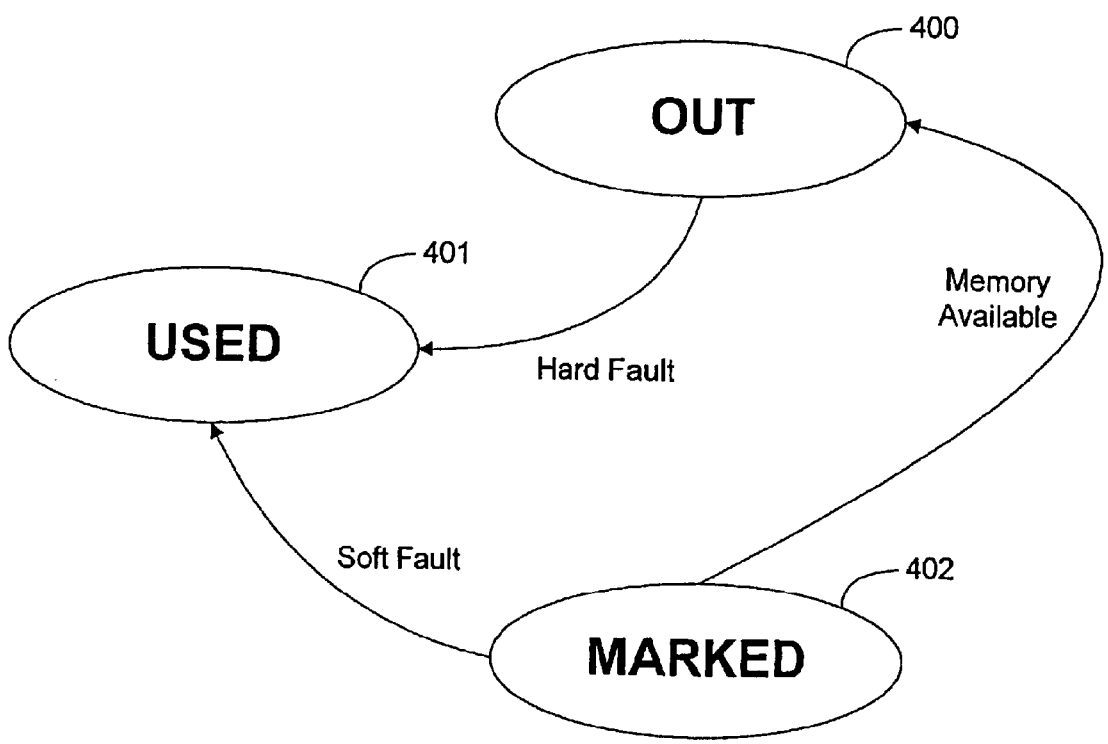
FIG. 4 is a state diagram showing the transitions between states for pages in RAM and in virtual memory.

FIG. 4 also shows when transitions indicate that a fault has occurred. Faults result when the assumptions made by the scanning algorithm are incorrect. The scanning algorithm assumes that if a page has not been accessed since the last scan, that page is no longer being used by a process, and therefore the page is marked as available and may be overwritten. The page may in fact still be in use, in which case a fault will occur when the page is needed again by the process.

The fault metric generated by a memory management algorithm, such as the mark-sweep algorithm, can be used to determine whether there is a RAM shortfall or deficit, and to estimate the amount of additional RAM needed for efficient operation of the system. For example, some operating systems, such as Solaris and NT, use memory management algorithms that define two types of faults, soft faults and hard faults. Soft faults, or minor faults, occur when a page is erroneously marked, but is not overwritten before the page is required by the process using the page. In other words, the page is still present in RAM, but is incorrectly listed as available to be overwritten. Therefore, when a soft fault has occurred, the page transitions from a marked state 402 to a used state 401. Soft faults occur at an average rate or frequency referred to as $F_{SF}$. Hard faults, or major faults, occur when a page is erroneously overwritten (after being marked as available) and must therefore be written from the disk back into RAM. In other words, when a hard fault has occurred, the page transitions from an out state 400 to a used state 401. Hard faults occur at an average rate or frequency referred to as $F_{HF}$.

The hard and soft fault rates can generally be obtained from the memory management system in the operating system, or can be easily derived from parameters obtained from the memory management system. For Solaris™, the hard and soft fault rates are available from the memory management system. In NT™, the number of hard faults is calculated as the number of pages read from the disk. The number of soft faults is calculated as the number of hard faults subtracted from the total number of "page faults," where a page fault occurs whenever a process requests a page that is either incorrectly marked as available or has been erroneously overwritten. RAM use will be efficient if hard faults seldom occur. The amount of additional memory needed to avoid hard faults may be estimated as follows. When the free RAM in the system is close to depleted—that is, when there is insufficient memory available—the scanning frequency $F_s$ typically increases. This is to decrease the likelihood that unused memory remains idle when it is needed by current processes: increasing the scanning frequency will typically free more pages of memory per unit of time.

As a result of the increased scanning frequency, the operating system marks more pages on each scan: the mark-sweep algorithm marks pages which have not been accessed since the last scan, and the time since the last scan decreases when the scanning frequency increases. Similarly, more pages are "paged out," because the algorithm pages out marked pages when a page is needed by another process. Thus, as a result of the memory deficit, nearly all the pages in RAM are marked, and pages are frequently "paged out." It follows that almost every memory access by a process causes a memory fault: either a hard fault, if the requested page is currently "paged out," or a soft fault, if the page is still in memory but marked as available.

If it is assumed that all pages are accessed at approximately the same average rate, the ratio of the frequencies of hard faults and soft faults, $F_{HF}/F_{SF}$, is the same as the ratio of the number of pages which are incorrectly "paged out" to the number of pages that are incorrectly "marked." The average number of incorrectly "paged out" pages is equal to the number of pages of memory that should be added to avoid hard faults—that is the memory deficit, $N_O$. The number of pages that are incorrectly marked may be estimated as the total number of pages being used. $N_U$ Thus the memory deficit may be estimated as:

It will be appreciated that the ratio of $F_{HF}$ to $F_{SF}$ may be very high if a process has just been terminated, and pages needed by other processes are therefore being loaded from disk to RAM. To avoid false alarms under these circumstances, the system must also monitor page writing activity—that is, whether pages are being written from RAM to disk. If a process has been terminated, the pages used by that process will not be written to disk, since they are no longer needed. When page writing activity is zero during a given observation period, the memory deficit, $N_o$, is zero. The estimate of the memory deficit is therefore multiplied by parameter C, which is zero when there is no page-writing activity. Thus, the memory deficit is estimated by:

$$\hat{N}_O = C \cdot N_U \cdot \frac{F_{HF}}{F_{SF}}$$

It will be appreciated that the memory deficit varies over time, and an instantaneous "snapshot" of the memory deficit at any instant in time is not particularly informative. Therefore, the estimate should be "smoothed" by averaging it over some period of time, typically on the order of a fraction of a second. Methods for averaging an estimate over time are well-known in the art and will not be described in more detail here. The time-smoothed estimate will provide a more useful indicator of the additional memory required to avoid hard faults, or at least limit the frequency with which hard faults occur to an acceptable level.

Simulated results for one embodiment of the invention were obtained for a test Windows NT™ system, using a system utility that gathers data on memory loading and fault rates. A listing of the code used to allocate memory and access it in a random order, so as to load the system in a controlled fashion, is provided in FIG. 6. A utility monitors the memory allocation performance of the system, and extracts the fault rates. The output of the utility was imported into a spreadsheet program. The actual and estimated memory deficit, using one embodiment of the invention, was then calculated and plotted, as shown in FIG. 5.

Figure 5:
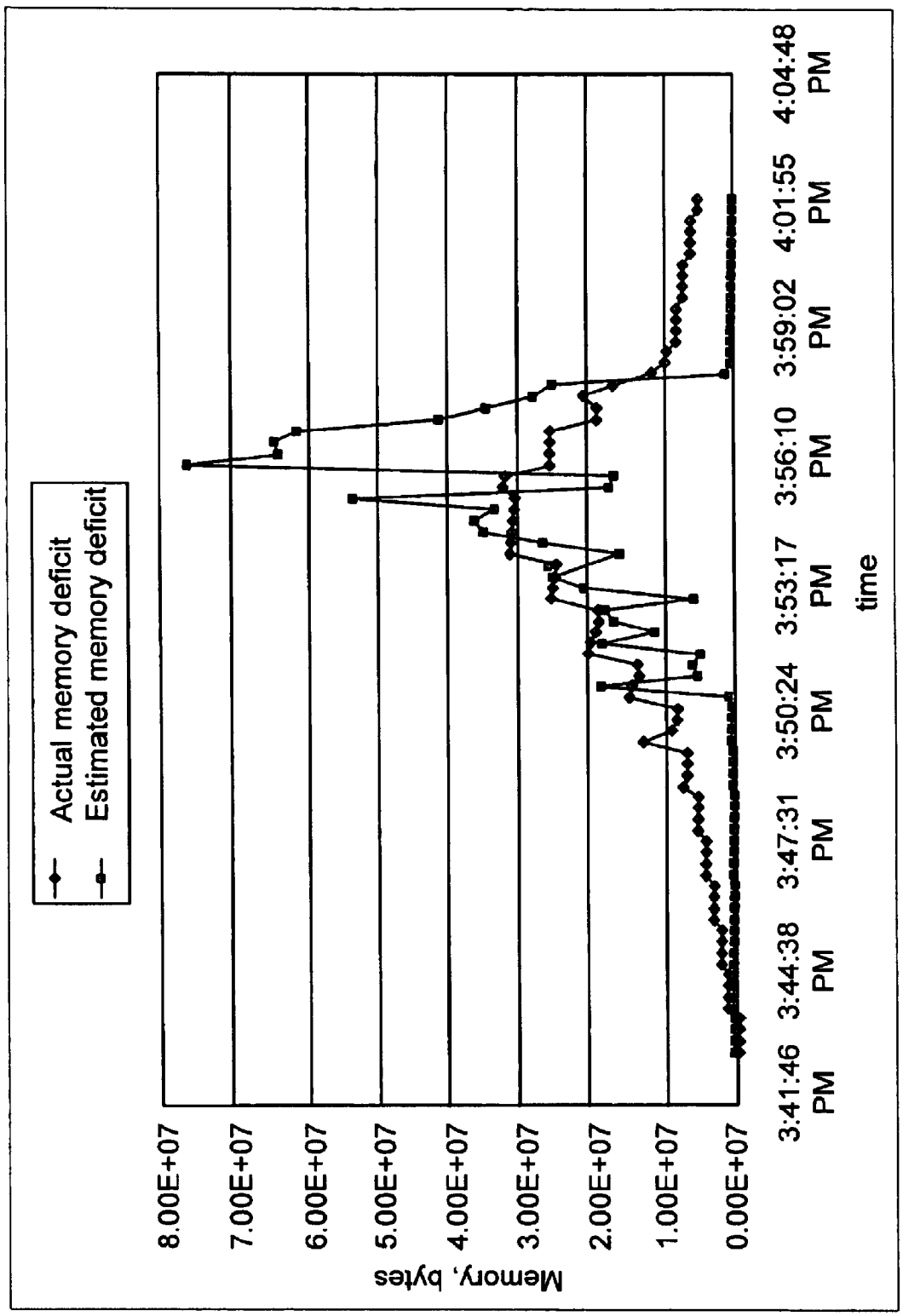
FIG. 5 shows a plot of test results for one embodiment of the claimed invention tracking memory requirements.

FIG. 5 thus shows the estimated memory demand, as calculated using the memory loading data, and the difference between the total virtual memory and the RAM actually used—that is, the actual memory demand. When the memory deficit is insubstantial, there is no paging activity, and the estimate is therefore zero. Where the memory deficit is significant, the estimate follows the trend reasonably well, although when the shortfall is severe the estimate overshoots the actual memory demand. Thus, the estimate of the memory demand, based on memory management parameters, reasonably tracks actual memory demand. It can therefore be used to determine the amount of RAM that must be added to a computer system to avoid excessive paging and improve operational deficiency.

While preferred embodiments of the invention have been described, these descriptions are merely illustrative and are not intended to limit the present invention. For example, while preferred embodiment relies on the assumption that all pages in virtual memory are accessed at approximately the same average rate, other assumptions could be made, resulting in different algorithms. Alternately, the state transition probabilities for the states peculiar to a given memory management algorithm—in the mark-sweep memory management algorithm, these are the marked state, the out state, and the used state—could be analyzed to determine the optimum number of pages of RAM needed for efficient operation.

Moreover, while the disclosure describes an operating system that provides information about fault rates, and uses this information to estimate the amount of frequently-used memory in the out state, the scope of the preferred embodiments is not so limited. Other approaches to estimating the amount of virtual memory which is frequently accessed, and therefore should be added to RAM to increase efficiency, may also be used.

What is claimed is:

1. A method for detecting excessive paging in a computer system, comprising:

obtaining memory management parameters from a computer operating system;

using the memory management parameters to determine a rate of hard faults, $F_{HF}$, a rate of soft faults, $F_{SF}$, a number of used pages in memory, $N_U$, and a page writing activity indicator C, where C is set equal to 1 if there is page-writing activity, and is 0 otherwise;

calculating memory demand $\check{N}_O$, where $\check{N}_O = C * F_{HF}/F_{SF} * N_U$.

2. The method of claim 1, further comprising comparing the calculated memory demand $\check{N}_O$ to a threshold value for a predetermined period of time.

3. The method of claim 2, further comprising:

providing $\check{N}_O$ units of additional RAM, where $\check{N}_O$ is the calculated memory demand.

4. A method for detecting excessive paging in a computer system, comprising:

obtaining memory management parameters from the computer operating system;

using the memory management parameters to determine a rate of hard faults, $F_{HF}$, a rate of soft faults, $F_{SF}$, a number of used pages in memory, $N_U$ and a page writing activity indicator C, where C is set equal to 1 if there is page-writing activity, and is 0 otherwise;

calculating the memory demand $\check{N}_O$ where $\check{N}_O = C = * F_{HF}/F_{SF} * N_U$;

applying averaging to the calculated memory demand to obtain an average, $\check{N}_O'$; and comparing the average of memory demand $\check{N}_O'$ to a threshold value for a predetermined period of time.

5. The method of claim 4, further comprising:

providing $\check{N}_O'$ pages of additional RAM.

6. A computer system, comprising:

memory;

a disk including virtual memory;

an operating system for providing memory management parameters and writing pages to virtual memory; and software that receives the memory management parameters and calculates memory demand;

wherein memory management parameters are related to a rate of hard faults, $F_{HF}$, and a rate of soft faults, $F_{SF}$;

wherein the software that calculates the memory demand includes code that calculates $\check{N}_O$ where $$\check{N}_O = C * F_{HF}/F_{SF} * \check{N}_U;$$

where C is set equal to 1 if there is page-writing activity, and is 0 otherwise, and $N_U$ is a number of used pages in memory.

7. The computer system of claim 6, wherein the software that calculates the memory demand includes code that performs a time-based average of the calculation $\check{N}_O$ to provide an average.

8. A computer program product for detecting excessive paging in a computer system, comprising:
   logic for obtaining memory management parameters from a computer operating system;
   logic for calculating memory demand; and
   logic for comparing the calculated memory demand to a threshold value for a predetermined period of time;
   wherein the memory management parameters comprise a rate of hard faults, $F_{HF}$, and a rate of soft faults, $F_{SF}$;
   wherein the logic that calculates the memory demand includes logic that calculates $\check{N}_O$, where $$\check{N}_O = C * F_{HF}/F_{SF} * N_U;$$

where C is set equal to 1 if there is page-writing activity, and is 0 otherwise, and $N_U$ is a number of used pages in memory.

9. The computer program of claim 8, wherein the logic that calculates the memory demand includes logic that performs a time-based average of the calculated value $\check{N}_O$ to provide an average estimate of the memory demand.

10. A method for managing memory in a computer system, comprising:
   obtaining memory management parameters from a computer operating system;
   determine a rate of hard faults, $F_{HF}$, a rate of soft faults, $F_{SF}$, a number of used pages in memory, $N_U$, and a page writing activity indicator, C, where C is set equal to 1 if there is page-writing activity, and is 0 otherwise;
   calculating the memory demand $\check{N}_O$ where;

$$\check{N}_O = C * F_{HF}/F_{SF} * N_U;$$

applying averaging to the calculated memory demand to obtain an average $\check{N}_O'$, by:
      calculating a number of used pages in an out state; and
      applying averaging to the calculation of the number of used pages in the out state, wherein the out state occurs when a page is not present in RAM and is stored only in a disk file; and
   adding RAM based on the calculated memory demand to the computer system by:
      identifying a page in physical memory that has been accessed less recently than another page;
      writing the contents of the selected page to virtual memory; and
      marking the identified page as available for use by another process.

* * * * *